United States Patent [19]

DelProposto et al.

[11] Patent Number: 4,827,830
[45] Date of Patent: May 9, 1989

[54] CHASSIS TOWVEYOR CART

[75] Inventors: Joseph DelProposto, Rochester; Donald R. Beleski, Farmington Hills, both of Mich.

[73] Assignee: American Hydrostatics Manufacturing Inc., Ferndale, Mich.

[21] Appl. No.: 175,710

[22] Filed: Mar. 31, 1988

[51] Int. Cl.$^4$ .............................................. F19B 25/02
[52] U.S. Cl. .......................................... 91/19; 91/31; 91/32; 91/33; 91/367; 91/388; 91/511; 91/519; 91/536
[58] Field of Search .................. 91/508, 511, 519, 536, 91/31, 32, 33, 19, 367, 388, 358 R

[56] References Cited

U.S. PATENT DOCUMENTS

| | | | |
|---|---|---|---|
| 2,519,900 | 8/1950 | Geiger et al. | 91/519 X |
| 2,994,303 | 8/1961 | Robra et al. | 91/31 X |
| 3,771,802 | 11/1973 | Hiramatu et al. | 91/31 X |
| 4,335,867 | 6/1982 | Bihlmaier | 91/358 R |
| 4,421,012 | 12/1983 | Mucheyer et al. | 91/388 |

Primary Examiner—Edward K. Look
Attorney, Agent, or Firm—Dykema Gossett

[57] ABSTRACT

A towveyor cart for use in hoisting an object and in particular an object having first and second interconnected portions from a first level to a fully raised level. The towveyor cart has control means which include a main control valve for simultaneously raising the jacks to an intermediate position between the lowermost position and the fully raised position and separate jogging valves for controlling each of the jacks separately between the intermediate and raised positions. In this way, both jacks can be simultaneously rapidly raised to the intermediate position and then independently jogged by the jogging valves to the final fully raised position. Horizontal adjusting means are provided so that a combination of horizontal and vertical adjustment for each jack, independent of the other jack, is obtained. Additionally, the towveyor cart is provided with an improved air reservoir which is mounted beneath the work platform of the cart as opposed to the conventional location which is on the platform. By mounting the air reservoir within the base, the platform or work area of the towveyor cart is unobstructed permitting the operator to more freely move along the base to perform the assembly function.

6 Claims, 4 Drawing Sheets

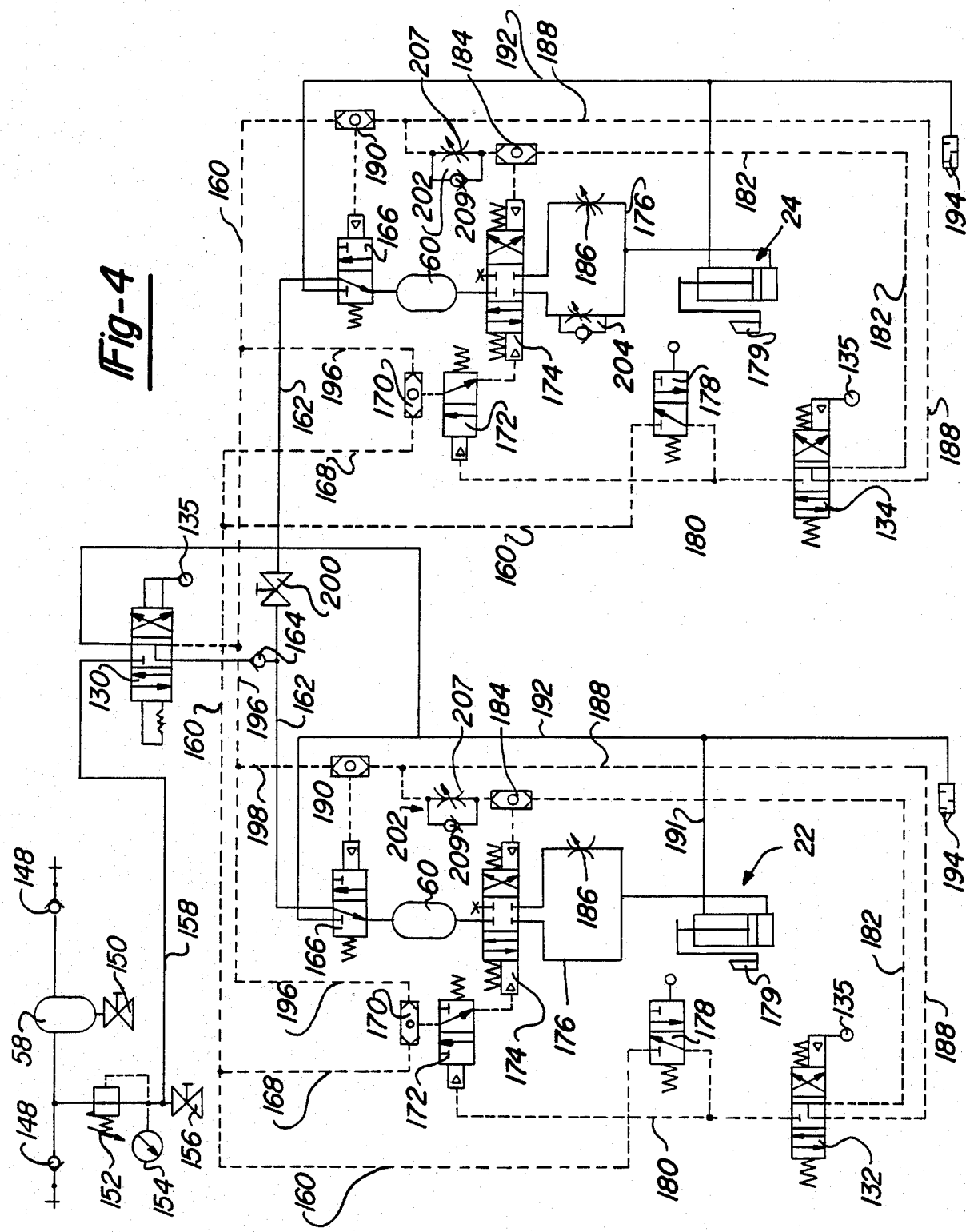

CHASSIS TOWVEYOR CART

The present invention relates to a chassis towveyor cart for use on an assembly line having two levels with parts being hoisted from a lower level for assembly at an upper level. For example, in the assembly of automobiles the chassis may progress along an upper assembly line as the engine and drive train are moved along a lower assembly line to be raised to the chassis for assembly. Towveyor carts of this general description are well known in the industry and are used for various hoisting tasks. For ease in description, the towveyor cart of the present invention will be described with respect to an engine and drive train for assembly to a chassis; however, it should be understood that the present invention is not intended to be limited in any way to this one application.

The standard towveyor cart includes two hoists or jacks which are controlled by an operator. The operator typically rides along on the base of the towveyor cart and controls the position of the engine and drive train so that they can be properly aligned with a chassis moving overhead. Other operators may be positioned on the towveyor cart to assist in proper positioning and attachment of the engine and drive train to the chassis.

As is common, the engine sits on one jack with the drive train sitting on the other jack. Alignment plates are mounted to each of the jacks and support the engine and drive train on the jacks. These alignment plates permit the engine and drive train to be separately adjusted within a horizontal plane.

The vertical control of the towveyor cart is typically achieved through a manually operated lever which is controlled by the operator to simultaneously raise and lower the jacks. Air pressure is supplied from an air reservoir which is mounted on the base between the jacks. Additionally, air oil tanks are mounted closely adjacent the jacks to provide hydraulic oil to the jacks as they are being operated.

The problem with conventional towveyor carts is the inability to separately adjust the jacks in the vertical direction and the limited work area on the base of the towveyor cart due to the location of the air reservoir. For example, it is frequently desirable to be able to independently adjust the engine or drive train in the vertical direction. This is of particular importance in the assembly of front wheel drive vehicles. With the popularity of front wheel drive vehicles, the assembly of the engine and drive train to the chassis is now done differently. Previously, the engine and rear axle were independently connected to the chassis with the drive shaft, hydraulic lines, exhaust tubing, etc. being connected afterwards. Now, since there is no drive shaft between the engine and rear axle, the engine and drive train including all of the hydraulic lines, exhaust tubing, etc. are preassembled and then hoisted from a lower level to the chassis moving overhead. Because of the interconnected lines and tubing, increased adjustability between the engine and drive train in the vertical direction becomes very important. If controls were available for this adjustment, it would be easier to align the parts for assembly. Additionally, the platform upon which the jacks and air reservoirs are mounted is the work area for the operator. This work area is substantially obstructed by the air reservoir making movement on the work area extremely difficult reducing the ability of the operator to perform his job.

BRIEF SUMMARY OF THE INVENTION

The present invention overcomes the above disadvantages by providing an improved towveyor cart which includes control means permitting an operator to raise and lower the hoists or jacks simultaneously to an intermediate position and then to independently raise and lower the jacks from the intermediate position to the desired raised position. The control means includes one main control valve for simultaneously raising the jacks to the intermediate position and separate jogging valves for controlling each of the jacks between the intermediate and the raised position. In this way, the engine and drive train can be rapidly raised to a position closely adjacent the chassis and then can be jogged independently by the separate jogging valves to properly align them in the vertical direction with respect to the chassis.

As before, horizontal positioning is accomplished through the alignment plates. By combining the horizontal adjustability with the improved vertical adjustability, the engine and drive train can be more efficiently mated with the chassis for assembly. Again, the example of using an engine and drive train for assembly to a chassis is only for purposes of explanation, it should be understood that other products can be easily assembled using the improved chassis towveyor cart of the present invention.

The fluid circuit of the present invention automatically shifts control of the jacks between the main control valve and the jogging valves. The main control valve only functions between the lower position and the intermediate position with the jogging valves functioning between the intermediate and fully raised positions.

Briefly, the main control valve controls the flow of fluid between three main lines. These three lines supply air from the air reservoir to separate fluid circuits which control the raising and lowering of each jack. To raise the jacks to the intermediate position, the main control valve is shifted to communicate fluid to the first of the three lines which is interconnected to each of the fluid cylinders through a respective first pilot valve, second fluid reservoir or an oil tank and second pilot valve. The first pilot valve is normally biased to communicate this fluid to the air oil reservoir with the second pilot valve being normally biased to prevent communication between the air oil reservoir and the respective jack. The second line controls the position of the second pilot valve through a third pilot valve. This third pilot valve permits fluid to be communicated to the second pilot valve to shift the second pilot valve to communicate fluid to the jack from the air oil reservoir which raises the respective jack.

To lower the jacks from the intermediate to the lower position, the main control valve is shifted in the opposite direction which connects the third line to the first pilot valve shifting this pilot valve to permit fluid to be exhausted from the jacks.

Once the jacks reach the intermediate position, the main control valve is operatively disconnected from the circuit and the jogging valves are connected to independently control each jack. A trigger valve is provided in each of the separate circuits and is triggered by the movement of each respective jack to the intermediate position. The trigger valve communicates fluid in the third line with the jogging valves which then independently control each respective jack.

To further control movement of each jack between the intermediate and the raised position, a control loop is provided in each fluid circuit to permit slower movement of the jacks when the jogging valve is operable. This control loops has a needle valve in the circuit between the air oil tank and the jack. When the jogging valve is operable, the fluid between the air oil tank and the jack is directed through this needle valve to restrict the upward movement of the jack. When the jogging valve is not operable, the fluid is directed to the opposite side of the loop which permits full pressure to the jack to rapidly move the jack between the intermediate and lowermost positions.

In addition to the control capability of the present invention, the towveyor cart is further improved by providing an air reservoir which is mounted within the base of the towveyor cart. By mounting the air reservoir within the base, the platform or work area of the towveyor cart is unobstructed permitting the operator to more freely move along the base to perform the assembly function. In the preferred embodiment, the air reservoir is defined by a plurality of air cylinders which are interconnected by tubing. The air cylinders are of different longitudinal lengths so that they can fit within the base portion and not interfere with the wheels of the base. Preferably, there are two central cylinders and two shorter side cylinders on each side of the center cylinders. The improved air reservoir provides the same supply of fluid as conventional air reservoirs used on towveyor carts without obstructing the platform.

Other advantages and meritorious features of the present invention will be more fully understood from the following description of the invention, the appended claims and the drawings, a brief description of which follows.

BRIEF DESCRIPTION OF THE DRAWINGS

FIG. 4 is a schematic illustration of the towveyor cart fluid circuit.

DETAILED DESCRIPTION OF THE INVENTION

Figure 1:
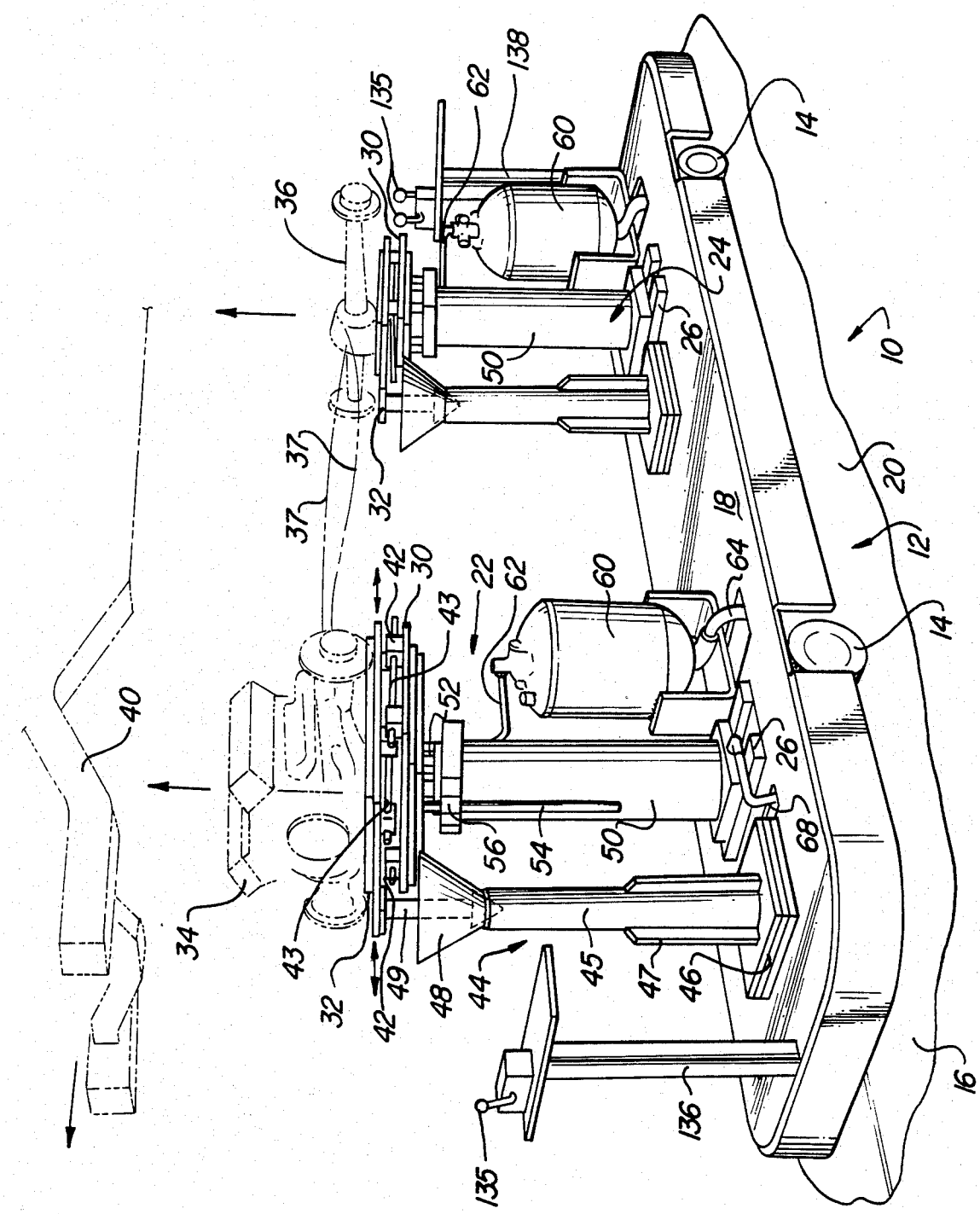
FIG. 1 is a perspective view of the towveyor cart of the present invention with an engine and drive assembly and chassis shown in phantom.

With reference to FIG. 1, the towveyor cart of the present invention is shown generally at 10. Cart 10 includes a base 12 which is supported upon wheels 14 such as for example castor wheels for movement along a lower surface 16. Base 12 includes a platform 18 from which an operator can work and downwardly extending sides 20. In the preferred embodiment, a cooperative guide and track are provided between the base and surface 16 to guide cart 10 along a predetermined path.

First and second fluid jacks 22 and 24 are mounted on pedestals 26 to base 12. Each of the jacks 22 and 24 are of standard construction including an outer cylinder housing 50 reciprocally supporting a piston 52. A mounting plate 30 is fixed to the top of piston 52 by, for example, machine bolts with an alignment plate 32 connected to mounting plate 30. A guide rod 54 is connected to the bottom of mounting plate 30 and slides within a rod guide 56 which is fixed to housing 50 to insure true vertical movement of piston 52.

The alignment plate 32 supports, for example, preassembled engine 34 and drive train 36 including brake lines, exhaust tubing, etc. shown generally at 37. The alignment plate is connected to the mounting plate 30 through a series of guide blocks 42 and guide rods 43. Guide rods 43 reciprocate within guide blocks 42 to permit movement of the alignment plate within a horizontal plane and facilitate alignment of the engine and drive train with respect to the chassis.

A centering device 44 is provided to center alignment plate 32 after the engine and drive train have been assembled to chassis 40. Each time the jacks 22 and 24 are lowered to their lowermost position, centering device 44 re-positions the alignment plate to its normal position so that another engine and drive train assembly can be positioned on the alignment plate. The centering device 44 includes a tubular post 45 mounted parallel to and adjacent the cylinder housing 50 of each jack 22 and 24. Post 45 is fixed to a platform 46 which is mounted to base 12. Stabilizers or supports 47 are mounted between the post 45 and platform 46 for further support. Mounted to the free end of post 45 is a receiving funnel or female receiver 48. This receiver is an inverted cone having a wide opening which narrows progressively to the diameter of post 45. A male centering device 45 is mounted to the underside of alignment plate 32 and extends vertically downwardly in the direction of funnel 48. As the jacks are lowered, centering device 44 contacts the inwardly sloping walls of funnel 48 to pull the alignment plate 32 back to its starting position. As should be understood, the adjustability of alignment plate 32 is preferably restricted to an area defined by the movement of centering device 49 within the area of the opening in funnel 48.

As should be apparent to those of ordinary skill in the art, the funnel 48 and male centering device 45 could be reversed with the funnel extending downwardly from alignment plate 32 and the male centering device 45 extending upwardly from post 45.

Pressurized air is supplied to each of the jacks 22 and 24 by an air reservoir 58. Reservoir 58 is connected through lines 62, 64 and 68 to a pair of air oil tanks 60 which are mounted adjacent jacks 22 and 24. Reservoir 58 is specially constructed so that it does not obstruct the work platform 18 of towveyor cart 10. As should be understood, typical towveyor carts include a large oval or oblong air reservoir which is mounted between the jacks and connected to the air oil tanks for supplying the necessary fluid to the jacks. Positioning the air reservoir between the jacks obstructs the platform and interferes with the operator's ability to work from the platform. To overcome this disadvantage, the present invention provides a specially constructed air reservoir 58 which is mounted within the base below platform 18 within the sides 20.

Figure 3:
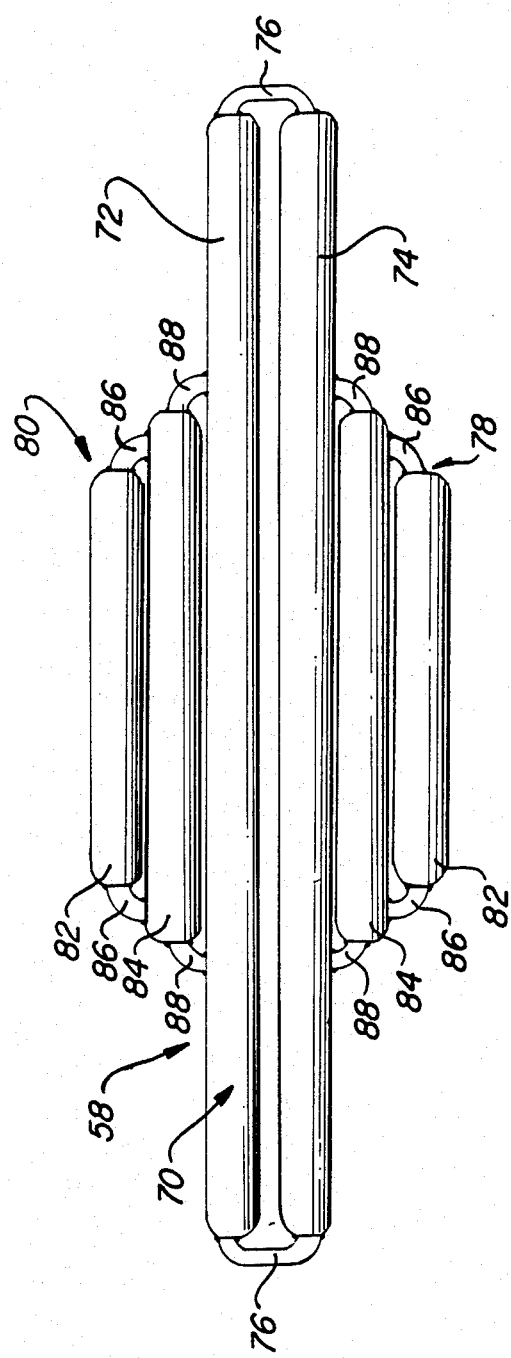
FIG. 3 is a top view of the fluid reservoir of the present invention.

With reference to FIG. 3, reservoir 58 includes a mid-portion 70 defined by two elongated air tight cylinders 72 and 74 which are in fluid communication through tubing 76. Mounted along each side of mid-portion 70 are shorter air tight cylinders 82 and 84 with cylinders 84 being slightly longer in the longitudinal direction than cylinders 82. Each of these cylinders are fluidly connected to one another and to the cylinders 72 and 74 of mid-portion 70 by connecting tubes 86 and 88 respectively. The shorter side cylinders 82 and 84 fit within the space between the rear of the front wheels and the front of the rear wheels. The mid-portion 70 extends between the inside of the front wheels and inside of the rear wheels. In this way, sufficient air is reserved in the air reservoir 58 for use in operating the towveyor without obstructing the work space provided on platform 18. In the preferred embodiment, reservoir 58 includes brackets (not shown) for supporting reservoir 58 from base 10; of course, other methods of securing the reservoir 58 below the platform are within the scope of this invention.

Figure 2:
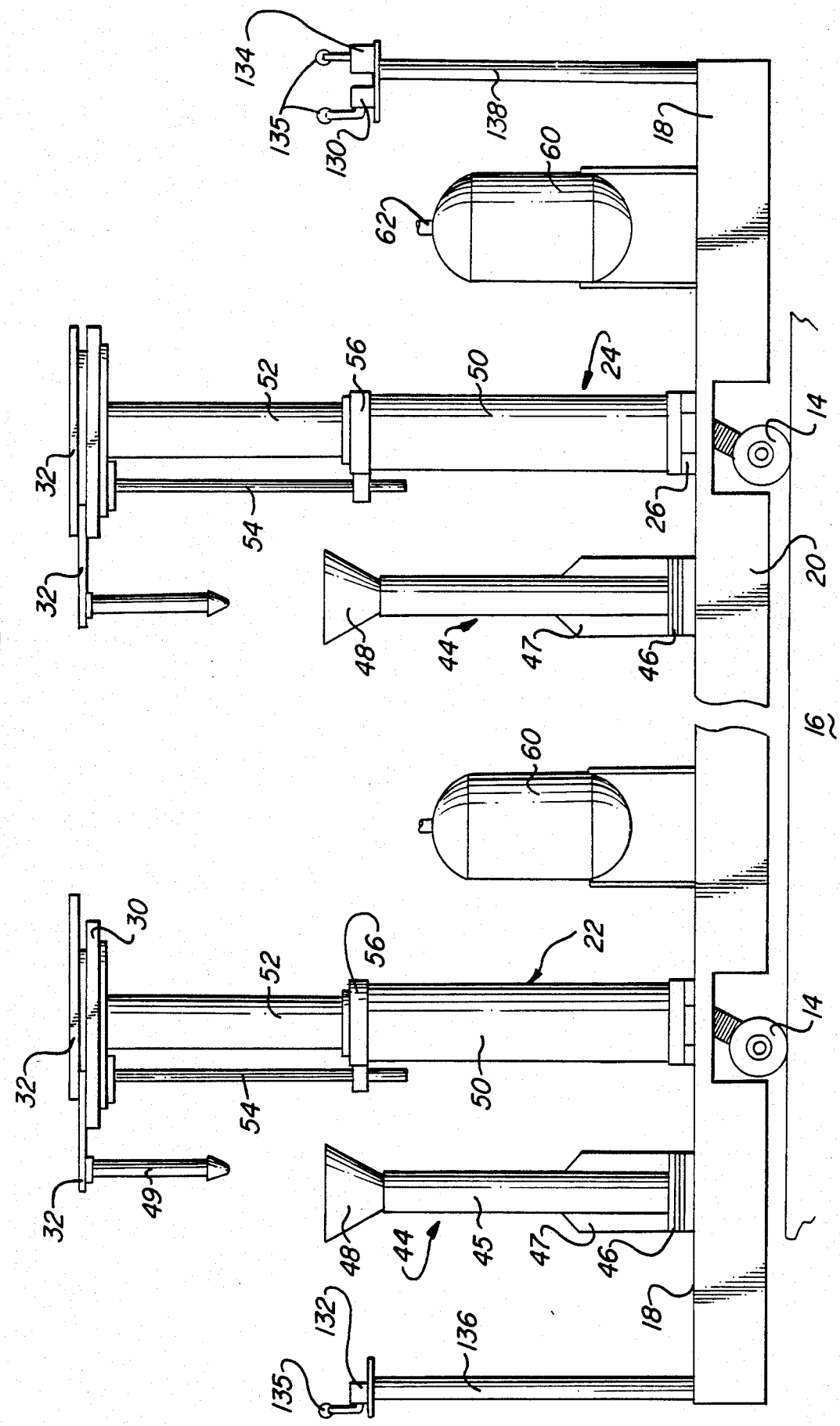
FIG. 2 is a side view of the towveyor cart of the present invention.

Referring again to FIGS. 1 and 2, control of the jacks 22 and 24 is provided through manual main control valve 130 and jogging valves 132 and 134 respectively. Main control valve 130 simultaneously controls the movement of the jacks 22 and 24 between their lowermost position and an intermediate position indicated by the H in FIG. 2 just below the final raised position indicated by the $H_1$ and $H_2$ in FIG. 2. First and second jogging valves 132 and 134 independently control jacks 22 and 24 between the intermediate position H and the fully raised positions $H_1$ and $H_2$. As should be understood, through this arrangement of control valves, the jacks can be rapidly and simultaneously moved to the intermediate position and then more slowly and independently jogged to their final position to facilitate assembly to the chassis 40.

In the preferred embodiment, the control valve 130 and jogging valves 132 and 134 are mounted to pedestals 136 and 138 for the convenience of the operator and are operated by control handles 135. As illustrated, the pedestals are at a level which is easily accesible to the operator from platform 18. Alternatively, either or both of the platforms 136 and 138 could be extended so that they are operable from the level upon which chassis 40 moves.

Referring to FIG. 4, the fluid circuit is schematically illustrated. In the preferred embodiment, this circuit includes quick disconnects 148 by which pressurized air can be supplied to air reservoir 58. An air regulator 152 and pressure gauge 154 are provided to regulate the pressure in reservoir 58. Additionally, ball valves 150 and 156 are provided to release excess pressure in air reservoir 58 if necessary.

Reservoir 58 is connected to the main control valve 130 through line 158 and controls the communication of pressurized air between line 158 ad the respective fluid circuits of each jack 22 and 24. In the preferred embodiment, valve 130 is a manual detent valve having three positions. The first position corresponds to raising the jacks, the second position corresponds to stopping the jacks and the third position corresponds to lowering the jacks. Shifting valve 130 to the right as illustrated in FIG. 4 corresponds to the raised position, the valve as shown is in the stopped position and shifting the valve to the left as illustrated in FIG. 4 corresponds to the lowering position.

To facilitate the description of the circuit, the description will be limited to jack 22 with it being understood that the same flow of fluid is occurring to jack 24 through a separate, but similar circuit. Additionally, each element of the circuit which controls jack 22 has been numbered in the same manner as each element of the circuit controlling jack 24.

To raise jack 22 between the lowermost position and the intermediate position, valve 130 is shifted to the right which communicates pressurized air from line 158 to lines 160 and 162. A check valve 164 is positioned between valve 130 and line 162 to prevent any backflow of air. The air in line 162 is communicated through a pilot valve 166 to air oil tank 60. In the preferred embodiment, pilot valve 166 is a three way normally open air pilot valve. Simultaneously, pressurized air is communicated to pilot valve 174 through lines 160 and 168, shuttle valve 170 and pilot valve 172. Preferably, valve 172 is a three way normally open valve and pilot valve 174 is a three position spring centering pilot valve. The pilot pressure communicated through pilot valve 172 forces pilot valve 174 from the normally closed position to the open position allowing pressurized fluid from air oil tank 60 to travel through flow loop 176 to jack 22 to raise piston 52. The pressurized fluid flows through the left side of loop 176 during this sequence. The opposite side of jack 22 is exhausted through line 191 to exhaust line 192 during the raising sequence.

When the jacks 22 and 24 reach the intermediate position, a trigger valve 178 is contacted which shifts valve 178 to communicate pressurized air between line 160 and 180. In the preferred embodiment, trigger valve 178 is a three way normally closed cam valve which is cammed by a camming member 179 on jack 22. The air communicated to line 180 acts against pilot valve 172 to shift valve 172 to the right or closed position stopping the communication of air to pilot valve 174 which is then biased to its normally closed position stopping the communication of fluid from air oil tank 60 to jack 22. Additionally, air in line 180 is communicated to the jogging valve 132. Again, it should be recognized that air is simultaneously being communicated to jogging valve 134 in the fluid circuit controlling jack 24.

Once trigger valve 178 is triggered, jogging valve 132 controls the movement of jack 22. Jogging valve 132 is shifted to the left, as shown in FIG. 4, to jog jack 22 upwardly and to the right to jog jack 24 downwardly. Shifting jogging valve 132 to the left communicates air in line 180 with line 182 which acts against pilot valve 174 through shuttle valve 184. The air pressure in line 182 shifts pilot valve 174 to the left communicating fluid in air oil tank 60 with jack 22 through the right side of loop 176. Positioned in this side of loop 176 is a needle valve 186 which restricts the flow of fluid to jack 22 so that the raising of the jack is more controlled than that obtained through the left side loop 176. Through the use of jogging valve 130, jack 22 can be raised from the intermediate to the fully raised position or to any position inbetween. Of course, the same is true of jack 24 which is operated through valve 134.

To lower jack 22 when jack 22 is past the intermediate position, jogging valve 132 is shifted to the right which communicates pressurized air in line 180 with line 188 which acts through shuttle valve 190 to shift pilot valve 166 to the left permitting pressurized air in air oil tank 60 to exhaust through exhaust line 192 to atmosphere. A muffler 194 is provided to reduce the noise of the air escaping. The fluid in the air oil tank is restrained from escaping in a conventional manner. Simultaneously, air is also communicated to pilot valve 174 through flow control valve 202 and shuttle valve 184. This shifts pilot valve 174 to the left permitting fluid in jack 22 to be exhausted through loop 176 into air oil tank 60 and then out exhaust line 192. Again, the fluid is being exhausted through the right side of the flow control loop 176 to reduce the rate of downward descent of jack 22 making it more controllable. Additionally, flow control valve 202 prevents hunting or inadvertent movement of jack 22 so that true positioning is obtained and maintained. Flow control valve 202 includes a needle valve 207 and a check valve 209 mounted in series to one another.

When both jacks 22 and 24 have been lowered to the intermediate position, control valve 130 is once again operative with valves 132 and 134 being inoperative. To further lower the jacks, valve 130 is shifted to the left as illustrated in FIG. 4 to communicate pressurized air from air reservoir 58 to line 196 which directs the air pressure through shuttle valve 170 and pilot valve 172 to shift pilot valve 174 to the right. Simultaneously, pressurized air is routed through line 198 and shutle valve 190 to shift pilot valve 166 to the left exhausting pressurized air from air oil tank 60 through exhaust line 192 to atmosphere.

In the preferred embodiment, a ball valve 200 is provided in line 162 between jacks 22 and 24. Ball valve 200 can be closed to render jack 24 inoperative so that only jack 22 functions. In some applications, there is only a need for one jack and ball valve 200 provides this alternative. Further, in the preferred embodiment, a second flow control valve 204 is positioned in flow loop 176 of jack 24. Flow control valve 204 is similar to valve 202 and prevents fluctuations in the movement of jack 24.

While the preferred embodiments of the present invention have been described so as to enable ones skilled in the art to practice the techniques of the present invention, the preceding description is intended to be exemplary and should not be used to limit the scope of the invention. The scope of the invention should be determined only by reference to the following claims.

What is claimed is:

1. A towveyor cart having spaced fluid jacks interconnected through a fluid circuit to a fluid reservoir, said fluid circuit comprising:

a manual control valve shiftable between first, second and third positions corresponding to raised, lowered and stopped positions of said jacks, said manual control controlling the flow of fluid to first, second and third fluid lines to raise and lower said jacks between a lowermost position and an intermediate position;

said first line being interconnected to each of said fluid cylinders through a respective first pilot valve, second fluid reservoir and second pilot valve, said first pilot valve being normally biased to communicate fluid to said second fluid reservoir with said second pilot valve being normally biased to prevent communication between said second reservoir and said jack;

said second line interconnected to a third pilot valve which is normally biased to communicate fluid to said second pilot valve to shift said second pilot valve to communicate fluid from said second reservoir to said jack when said manual control valve is in said raised position;

said third line connected to said first pilot valve to shift said first pilot valve to exhaust fluid from said respective jack for lowering said jack when said manual control valve is shifted to said lowered position;

a pair of manually operated jogging valves for independently jogging each of said jacks between said intermediate position and a final raised position, said jogging valve being inoperative until said jacks reach said intermediate position;

whereby said manual control valve automatically raises and lowers said jacks between said lowermost and said intermediate positions and said jogging valves jog said jacks independently between said intermediate and said final raised positions.

2. The towveyor cart of claim 1, further including a trip valve operatively responsive to movement of said jacks, said valve being tripped when said jacks reach said intermediate position;

said trip valve being connected between said second line and a fourth line and normally biased to prevent communication between said second and fourth lines;

said jogging valve being connected at one end of said fourth line with said second pilot valve connected to the opposite end of said fourth line, said jogging valve and second pilot valve being supplied fluid when said trip valve is shifted against said bias in response to movement of said jack, said supply fluid shifting said second pilot valve to close communication with said third pilot valve which closes communication between said second reservoir and said jacks;

said jogging valve being interconnected to fifth and sixth lines, said fifth line communicatig with said third pilot valve to raise said jack and said sixth line communicating with said first pilot valve to lower said jack, said jogging valve being shiftable to communicate fluid between said fourth line and either said fifth or sixth lines to jog said jack either upwardly or downwardly.

3. The towveyor cart of claim 1, further including a fluid loop between said third pilot valve and said jack, said loop having a flow control means therein for restricting the flow of fluid therethrough, said third pilot valve being shifted to permit unrestricted fluid flow to said jack from said second reservoir when said jack is operated between said lowermost and said intermediate positions, said third pilot valve being shifted to permit restricted fluid flow to said jack from said second reservoir when said jack is jogged between said intermediate and raised positions;

whereby said jacks are rapidly raised and lowered between said lowermost and intermediate positions and thereafter more slowly raised and lowered between said final raised position and said intermediate position by said jogging valves.

4. The towveyor cart of claim 3, further including a flow control valve positioned between said jogging valves and said jacks to prevent inadvertant movement of said jack due to fluctuations in line pressure.

5. The towveyor cart of claim 4, wherein said flow control valve includes a needle valve and a check valve.

6. The towveyor cart of claim 1, further including valve means for isolating one of said jacks from said other jack such that only one jack is operative.

* * * * *